May 12, 1925.
E. F. W. ALEXANDERSON
SYSTEM OF DISTRIBUTION
Filed Oct. 28, 1921
1,537,055
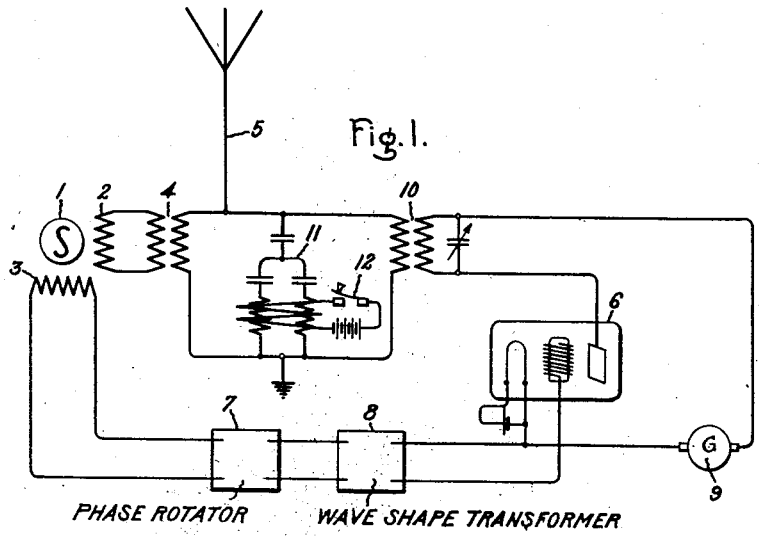
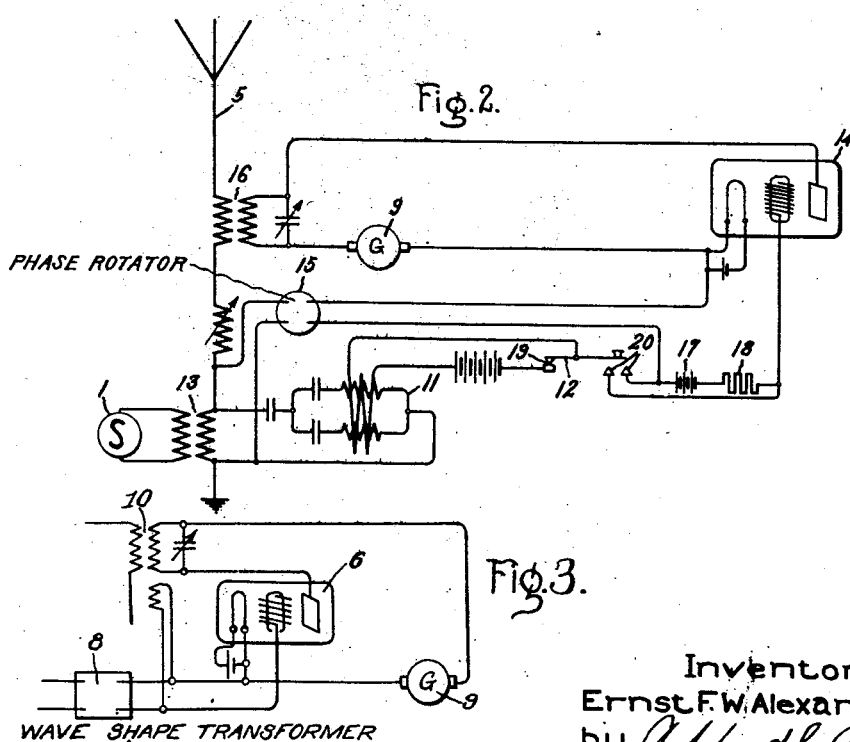
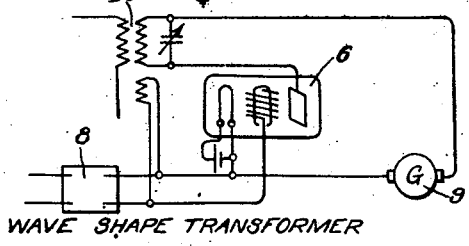
Inventor:
Ernst F. W. Alexanderson,
by
His Attorney.

Patented May 12, 1925.

1,537,055

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

SYSTEM OF DISTRIBUTION.

Application filed October 28, 1921. Serial No. 511,128.

*To all whom it may concern:*

Be it known that I, ERNST F. W. ALEXANDERSON, a citizen of the United States, residing at Schenectady, in the county of Schenectady, State of New York, have invented certain new and useful Improvements in Systems of Distribution, of which the following is a specification.

My present invention relates to systems of electrical distribution, and more particularly to a method of and apparatus for supplying to a distribution system high frequency alternating currents derived from two dissimilar sources.

The object of my invention is to provide a system for supplying to a distribution system alternating currents of like frequency and phase derived from two dissimilar sources such, for example, as a high frequency alternator and the output circuits of vacuum tube devices.

In carrying my invention into effect, a high frequency alternator may be employed having separate armature windings. Current from the major portion of these windings may be supplied directly to the distribution system while current from a separate winding or windings is supplied to the input circuit of a vacuum tube generator or amplifier. By properly adjusting the phase of the current supplied to the input circuit of the vacuum tube current may be supplied from the output circuit thereof to the distribution system which will be in phase with the current supplied thereto from the alternator windings.

If it is desired to employ the current thus supplied to the distribution system for signaling purposes, the currents supplied to the transmitting system from the two different sources may simultaneously be controlled by means of a single device such as the well known magnetic amplifier. In case the high frequency alternator does not have separate armature windings the entire output of the alternator may be supplied to the distribution system or transmitting circuit, and current may then be supplied from the distribution system to the input circuit of the amplifier, the phase of the current thus supplied being regulated to produce the desired effect.

The novel featurs which I believe to be characteristic of my invention are set forth with particularity in the appended claims. My invention itself, however, both as to its organization and method of operation may best be understood by reference to the following description taken in connection with the accompanying drawing in which Fig. 1 shows diagrammatically a radio signaling system supplied with current from a high frequency alternator and from the output circuit of a vacuum tube amplifier, the two currents being supplied to the system in parallel; Fig. 2 shows a modification in which the entire output of an alternator is supplied to an antenna and the output of a vacuum tube amplifier is supplied to the antenna in series relation to the current supplied by the alternator; and Fig. 3 shows a modification in which the vacuum tube itself acts as a generator of continuous oscillations.

As indicated in Fig. 1 of the drawing, the high frequency alternator 1 is provided with separate armature windings 2 and 3. Current from the winding 2 is supplied by means of transformer 4 to the antenna 5. Current from winding 3 of the alternator is supplied to the input circuit of a vacuum tube amplifier 6 of the usual three-electrode type. The phase of the current thus supplied to the input circuit of amplifier 6 may be regulated by means of a phase rotator 7 and the wave shape of the current thus supplied may be adjusted to a form most suitable for the operation from the amplifier by means of the wave shape transformer 8 of any desired or convenient form. The output circuit of amplifier 6 includes a direct current source 9. An amplified high frequency current of the same phase and frequency as that supplied by the transformer 4 may be supplied to the antenna 5 by a transformer 10, the primary winding of which is included in the output circuit of amplifier 6. If it is desired to transmit telegraphic signals the current supplied to the antenna may be controlled by means of a magnetic amplifier 11 connected in shunt to the secondary windings of transformers 4 and 10 in the manner more fully set forth in my United States Patent No. 1,328,610, transmission of signals being effected by means of a key 12.

In case the high frequency alternator is not provided with separate windings the entire output of the alternator may be supplied to the antenna 5 by means of transformer 13, as indicated in Fig. 2. Current may be supplied to the input circuit of amplifier 14 through the phase rotator 15 which is connected in shunt to the secondary of transformer 13. Current from the output circuit of amplifier 14 may be supplied to the antenna 5 by means of the transformer 16, the secondary of which is connected in series relation in the antenna circuit. The output of the high frequency alternator 1 may be controlled by means of the magnetic amplifier 11 and the key 12, as in the arrangement shown in Fig. 1. When the key 12 is in the position indicated in the drawings the secondary of the transformer 13 will be practically short circuited so that substantially no current will be supplied to the antenna 5. In order that the amplifier 14 shall be inactive at this time in supplying current to the antenna 5 a battery 17 and resistance 18 may be employed in the input circuit of amplifier 14 for impressing so high a negative potential upon the grid of amplifier 14 that substantially no current will flow in its output circuit. When the key 12 is operated to open the contact at 19 it bridges the contacts 20 and thereby short circuits the battery 17 and resistance 18. The negative potential being thus removed from the grid of amplifier 14 it will function in its usual manner and supply high frequency current to the antenna at the same time that current is supplied thereto by the alternator.

While I have shown and described two modifications of my invention showing its application to a radio signaling system, it will be apparent that many modifications in the circuit arrangements employed, the manner of controlling the high frequency current, and the use to which the current supplied to the system is applied, may be made without departing from the scope of my invention as set forth in the appended claims. For example, the vacuum tube circuits may be so organized that the device will act as a generator of continuous oscillations by reason of a feed-back connection between the output and input circuits as indicated in Fig. 3. The phase of the oscillations generated may then be made to correspond to that of the generator oscillations by supplying a small amount of energy from the generator to the input circuit of the vacuum tube.

What I claim as new and desire to secure by Letters Patent of the United States, is—

1. The combination in a system of electrical distribution of an alternating current dynamo electric machine, a distribution circuit, an electron discharge device having input and output circuits, means for supplying current from said dynamo electric machine to the input circuit of said device, and means for supplying to said distribution circuit currents of like phase and frequency derived from said dynamo electric machine and from the output circuit of said device.

2. The combination in a system of electrical distribution of an alternating current dynamo electric machine, a distribution circuit, an electron discharge device having input and output circuits, means for supplying current from said dynamo electric machine to the input circuit of said device, means for adjusting the phase of the current thus supplied, and means for supplying to said distribution circuit currents of like phase and frequency derived from said dynamo electric machine and from the output circuit of said device.

3. The combination in a system of electrical distribution of an alternating current dynamo electric machine, a distribution circuit, a vacuum tube having input and output circuits, means for supplying current from said dynamo electric machine to the input circuit of said vacuum tube, means for supplying to said distribution circuit currents of like phase and frequency derived from said dynamo electric machine and from the output circuit of said vacuum tube, and means for simultaneously controlling the amplitudes of the currents thus supplied.

4. The combination in a high frequency signaling system of a high frequency alternator, a signaling circuit, a vacuum tube having input and output circuits, means for supplying current from said alternator to the input circuit of said vacuum tube, and means for supplying to said signaling circuit currents of like phase and frequency derived from said alternator and from the output circuit of said vacuum tube.

5. The combination in a high frequency signaling system of a high frequency alternator, a signaling circuit, a vacuum tube having input and output circuits, means for supplying current from said alternator to the input circuit of said vacuum tube, means for adjusting the phase of the current thus supplied, and means for supplying to said signaling circuit currents of like phase and frequency derived from said alternator and from the output circuit of said vacuum tube.

6. The combination in a high frequency signaling system of a high frequency alternator, a signaling circuit, a vacuum tube having input and output circuits, means for supplying current from said alternator to the input circuit of said vacuum tube, means for supplying to said signaling circuits currents of like phase and frequency derived from said alternator and from the output circuit of said vacuum tube, and means for simultaneously controlling in accordance with signals the amplitudes of the currents.

7. The combination in a high frequency signaling system of a high frequency alternator, a signaling circuit, a vacuum tube having input and output circuits, means for supplying current from one winding of said alternator to the input circuit of said vacuum tube, and means for supplying to said signaling circuit currents of like phase and frequency derived from another winding of said alternator and from the output circuit of said vacuum tube.

8. The combination in a high frequency signaling system of a high frequency alternator, a signaling circuit, a vacuum tube having input and output circuits, means for supplying current from said alternator to the input circuit of said vacuum tube, and means for supplying in parallel to said signaling circuit currents of like phase and frequency derived from said alternator and from the output circuit of said vacuum tube.

9. The combination in a high frequency signaling system of a high frequency alternator, a signaling circuit, an electron discharge device having input and output circuits, means for supplying from one winding of said alternator to the input circuit of said device, means for adjusting the phase of the current thus supplied, and means for supplying in parallel to said signaling circuit currents of like phase and frequency derived from other windings of said alternator and from the output circuit of said device.

10. The method of supplying current to a distribution system from a dynamo electric alternating current generator in combination with an electron discharge device having input and output circuits which consists in supplying current from the generator to the input circuit of the device, supplying current to the distribution system from the output circuit of the device, and from the generator and regulating the phase of the current supplied to the input circuit of the device so that the two currents supplied to the distribution system will be in phase.

In witness whereof, I have hereunto set my hand this 22nd day of October, 1921.

ERNST F. W. ALEXANDERSON.